(12) United States Patent
Pei et al.

(10) Patent No.: US 9,708,529 B2
(45) Date of Patent: Jul. 18, 2017

(54) BULK POLYMER COMPOSITES

(71) Applicant: THE REGENTS OF THE UNIVERSITY OF CALIFORNIA, Oakland, CA (US)

(72) Inventors: Qibing Pei, Calabasas, CA (US); Qi Chen, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 442 days.

(21) Appl. No.: 14/293,102

(22) Filed: Jun. 2, 2014

(65) Prior Publication Data

US 2014/0346400 A1    Nov. 27, 2014

Related U.S. Application Data

(63) Continuation of application No. PCT/US2012/069556, filed on Dec. 13, 2012.
(Continued)

(51) Int. Cl.
*C09K 11/06* (2006.01)
*H01L 51/00* (2006.01)
(Continued)

(52) U.S. Cl.
CPC ............... *C09K 11/06* (2013.01); *C08F 2/02* (2013.01); *C08F 2/44* (2013.01); *C08F 2/50* (2013.01);
(Continued)

(58) Field of Classification Search
CPC .. H01L 51/0044; H01L 51/0043; C09K 11/06
(Continued)

(56) References Cited

U.S. PATENT DOCUMENTS

| | | | |
|---|---|---|---|
| 4,358,401 A | | 11/1982 | O'Brien et al. |
| 5,110,500 A | * | 5/1992 | Walker .................... G01T 1/203 |
| | | | 252/301.16 |

(Continued)

FOREIGN PATENT DOCUMENTS

WO    2013/090610 A1    6/2013

OTHER PUBLICATIONS

Diaz. Study of the substituent groups effect on the room-temperature phosphorescent emission of fluorene derivatives in solution. Analytica Chimica Acta 489 (2003) 165-171.*
(Continued)

*Primary Examiner* — Matthew E Hoban
(74) *Attorney, Agent, or Firm* — O'Banion & Ritchey LLP; John P. O'Banion

(57) ABSTRACT

A method for the synthesis and use of transparent bulk conjugated polymers prepared from liquid monomers via bulk polymerization. The liquid monomer contains pi-electron conjugated moieties and polymerizable moieties. The monomer solution may also have functionalizing additives such as a luminescence additive that includes organic dyes, luminescent molecules, fluorescent compounds, phosphorescent compounds, and luminescent quantum dots. The monomer solution may also have sensitizing additives such as high-energy photo sensitizing compounds, nanoparticles of compounds containing atoms with atomic numbers greater than 52 and neutron sensitizing additives. The monomer solution is polymerized by heating to an elevated temperature with or without addition of an initiator. Alternatively, the monomer is polymerized by photo-induced polymerization. A photoinitiator may be employed to initiate the photopolymerization. Scintillation materials with significant light yields are illustrated.

19 Claims, 6 Drawing Sheets

Related U.S. Application Data

(60) Provisional application No. 61/569,890, filed on Dec. 13, 2011.

(51) Int. Cl.

| | | |
|---|---|---|
| *C08F 20/10* | (2006.01) | |
| *C08F 2/44* | (2006.01) | |
| *C08F 2/02* | (2006.01) | |
| *C08F 2/50* | (2006.01) | |
| *H05B 33/14* | (2006.01) | |
| *H05B 33/20* | (2006.01) | |
| *C08F 212/08* | (2006.01) | |
| *C09K 11/02* | (2006.01) | |

(52) U.S. Cl.
CPC ............ *C08F 20/10* (2013.01); *C08F 212/08* (2013.01); *C09K 11/025* (2013.01); *H05B 33/14* (2013.01); *H05B 33/20* (2013.01); *C09K 2211/1416* (2013.01)

(58) Field of Classification Search
USPC ....................................... 252/301.16
See application file for complete search history.

(56) References Cited

U.S. PATENT DOCUMENTS

| | | | |
|---|---|---|---|
| 5,258,478 A * | 11/1993 | Schlenoff | C07D 311/30 |
| | | | 526/268 |
| 5,442,021 A | 8/1995 | Heiliger | |
| 2003/0039838 A1 * | 2/2003 | Chen | C08G 61/02 |
| | | | 428/411.1 |
| 2006/0182899 A1 | 8/2006 | Kelly et al. | |
| 2007/0257603 A1 * | 11/2007 | Suzuki | C07C 13/567 |
| | | | 313/504 |
| 2010/0093967 A1 * | 4/2010 | Cella | C07C 43/21 |
| | | | 528/8 |
| 2010/0327735 A1 * | 12/2010 | Cella | H01L 51/0039 |
| | | | 313/504 |
| 2011/0095231 A1 | 4/2011 | Dai et al. | |

OTHER PUBLICATIONS

Charlesby. Section 11: Recent Advances in the Study of Irradiated Polymers. Comparative effects of radiation. Wiley and Sons NYC 1960. p. 242-243.*
Donat-Bouillud. Light-Emitting Diodes from Fluorene-Based π-Conjugated Polymers.Chem. Mater. 2000, 12, 1931-1936.*
Sugiyama. Living Anionic Polymerization of Styrene Derivatives para-Substituted with π-Conjugated Oligo(fluorene) Moieties. Macromolecules 2009, 42, 4053-4062.*
Korean Intellectual Property Office (KIPO), International Search Report and Written Opinion, issued on Mar. 27, 2013, for corresponding International Patent Application No. PCT US2012/069556 (pp. 1-12) and claims (pp. 13-17) pp. 1-17.
Derenzo, et al. "The quest for the ideal inorganic scintillator," Nuclear Instruments and Methods in Physics Research A 505 (2003) 111-117.
Qibing Pei, "Light-Emitting Polymers," Material Matters (2007), 2.3, 26.

* cited by examiner (TFS)

(DFS)

BULK POLYMER COMPOSITES

CROSS-REFERENCE TO RELATED APPLICATIONS

This application is a 35 U.S.C. §111(a) continuation of PCT international application number PCT/US2012/069556 filed on Dec. 13, 2012, incorporated herein by reference in its entirety, which claims priority to, and the benefit of, U.S. provisional patent application Ser. No. 61/569,890 filed on Dec. 13, 2011, incorporated herein by reference in its entirety. Priority is claimed to each of the foregoing applications.

STATEMENT REGARDING FEDERALLY SPONSORED RESEARCH OR DEVELOPMENT

This invention was made with Government support under HDTRA1-07-1-0028 awarded by the U.S. Department of Defense, Defense Threat Reduction Agency. The Government has certain rights in the invention.

The above-referenced PCT international application was published as PCT International Publication No. WO 2013/090610 on Jun. 20, 2013, which publication is incorporated herein by reference in its entirety.

INCORPORATION-BY-REFERENCE OF COMPUTER PROGRAM APPENDIX

Not Applicable

BACKGROUND OF THE INVENTION

1. Field of Invention

This invention pertains to the production and use of organic polymer frameworks and more particularly to the synthesis and use of transparent bulk conjugated polymers prepared from one or more liquid monomers containing at least one pi-electron conjugated moiety and at least one polymerizable moiety, through bulk polymerization.

2. Background

Scintillation is a phenomenon that has been exploited in some form to detect ionizing radiation for nearly a century. Exposure of certain materials to ionizing radiation such as x-rays, alpha and beta particles, gamma rays and neutrons results in the emission of photons from the material, typically in the visible, ultra-violet or infrared ranges. The light output of a scintillator material essentially depends on its efficiency in the conversion of the ionization energy to photons. The emitted photons from the scintillator material can be received by a photo-electric device such as a photomultiplier or charge coupled device where it is converted to an electrical signal. The resulting signal can be amplified, analyzed and recorded.

Early inorganic scintillation materials included $CaWO_4$ and ZnS that were used in the study of x-rays and alpha particles respectively. The scintillation properties of a wide range of other materials were also investigated including activated halide crystals, lithium containing compounds, thallium activated NaI and core-valence luminescence of $BaF_2$. Organic scintillators that emit light when exposed to different types of radiation have also been developed in recent years.

Medical imaging, geophysical exploration and other industrial applications contributed to the demand for more efficient high light output scintillators. Conventional plastic scintillators are typically composed of a polymeric matrix such as polyvinyltoluene (PVT) and a fluorescent compound such as diphenylstilbene (DPS). This material can be easily shaped and fabricated in various forms such as rods, sheets and cylinders. However, the typical polyvinyl or polystyrene based scintillators often need to be kept in a highly polished state and are susceptible to the formation of microcracks in the surface from use and are also sensitive to cleaning solvents such as alcohols.

Plastic scintillators have been shown to have comparatively higher absorption characteristics for electrons and neutrons but have a lower detection efficiency with gamma rays when compared with inorganic materials. The neutron detection efficiency is dependent on the energy, threshold, thickness and volume of the plastic scintillator used.

Only a small fraction of the kinetic energy of an ionized particle encountering a scintillator is lost in the conversion into fluorescent light, and the rest is dissipated in the form of heat or lattice vibrations. The radiation energy that is ultimately converted into fluorescence energy (scintillation efficiency) depends on the radiation particle type and its energy. Generally, the light output of a scintillator is different for different types of particles at the same energy. The light output ultimately determines the efficiency and resolution of the scintillator.

Scintillation efficiency is a function of the type of matrix, dimensions and fluor that are used. The absolute scintillation efficiency of a particular material is the ratio of the amount of energy of the emitted light to the energy lost by the ionizing radiation. A high absolute scintillation efficiency in a material is desired to maximize the detection sensitivity of the sensor to the ionizing radiation.

There have been many attempts to increase the scintillation efficiency of organic scintillators by exploring alternative polymer matrices. Such attempts have identified several polymers and monomers that exhibit increased efficiencies. However, plastic scintillators still only produce a quarter of the light output of inorganic materials and have been largely ignored in the field of gamma-ray measurements even though plastic scintillators are less expensive to manufacture, less temperature sensitive, rugged and machinable.

Accordingly, there is a need for increasing the efficiency and discrimination of organic scintillators in the detection of high-energy particles and ionizing radiation. There is also a need to economically produce a scintillation material that is stable, durable, optically transparent and machinable on a large scale. The present invention satisfies these needs as well as others and is generally an improvement over the art.

SUMMARY OF THE INVENTION

The present invention generally provides methods for the synthesis and use of transparent bulk conjugated polymers prepared from liquid monomers via bulk polymerization. The liquid monomer contains at least one pi-electron conjugated moiety and at least one polymerizable moiety. Sensitizing and luminescent additives can also be included in the monomer solution before polymerization.

The monomer is polymerized by heating to an elevated temperature with or without addition of an initiator. Alternatively, the monomer may be polymerized by photo-induced polymerization. A photoinitiator can also be employed to initiate the photopolymerization. The monomer is preferably a liquid at ambient temperature, but may be melted at an elevated temperature with a melting temperature no more than 120° C.

The term "monomer" is used herein in the general sense to refer to the molecular entity or unit that has at least one polymerizable moiety and at least one conjugated moiety and not intended to be limiting. The polymerized unit may be a singular monomer or may be oligomeric. The monomer units may be symmetrical or unsymmetrical as well as branched or linear. The units may also be co-polymers. The monomer units may be structurally simple or complex.

In one preferred embodiment, the pi-electron conjugated moiety consists of at least 15 $sp^2$ hybridized carbons. Some of the carbon atoms in the monomer conjugated moiety structure may be replaced by a heteroatom such as nitrogen, sulfur or silicon.

One example of suitable conjugated moieties include dimers, trimers, tetramers, pentamers, hexamers, and oligomers of fluorene and phenylene. Others include triphenylamine, triarylamine, triphenyl silane, tetraphenylsilane, diphenyl-1,3,4-oxadiazole, diphenyltrazole, diphenyl benzothiadiazole, fluorenyl benzothiadiazole, fluorenyl thiphene, difluorenyl thiophene, and their derivatives. Alternative conjugated moieties include spirobifluorene, various acenes, such as naphthalene, anthracene; and their oligomers as well as arylsilanes, where a silicon atom is bonded to at least two aryl groups.

The polymerizable moiety of the monomer is preferably selected from the group including acrylate esters, methacrylate esters, acrylic acid, methacrylic acid, acrylamide, methacrylamide, styrene, methyl styrene, oxetanes, urethane bond forming functional groups and various epoxides, or a mixture thereof. Suitable monomers may contain one, two, or more polymerizable moieties.

One embodiment of the starting material of the invention is a solution comprising one or more conjugated monomers with at least one pi-electron conjugated moiety and at least one polymerizable moiety.

Another embodiment of the starting material of the invention is a solution comprising a first type of conjugated monomer and a second type of monomer selected from the group consisting of acrylate esters, methacrylate esters, acrylic acid, methacrylic acid, acrylamide, methacrylamide, styrene, methyl styrene, dimethyl styrenes, substituted styrenes, oxetanes, various epoxides, or a mixture thereof. The monomers may contain one, two, or more polymerizable moieties.

Another preferred embodiment of invention is a solution comprising at least one type of conjugated monomer and a luminescent additive such as organic dyes, luminescent conjugated molecules, luminescent conjugated polymers, fluorescent organometallic compounds, phosphorescent organometallic compounds, luminescent quantum dots, and mixtures thereof.

A further embodiment of the starting material of invention is a solution comprising at least one type of conjugated monomer, a luminescent additive, and a sensitizing additive. The sensitizing additives preferably include high-energy photo sensitizing compounds or nanoparticles of compounds containing high atomic number atoms or neutron sensitizing additives or combinations of these additives. High-energy photo sensitizing compounds include organobismuth compounds, organolead compounds, and barium compounds. Sensitizing nanoparticles include nanoparticles of compounds containing high atomic number atoms such as bismuth oxide, bismuth fluoride, bismuth oxyfluoride, gadolinium oxide, gadolinium oxyfluoride, hafnium oxide, lutetium fluoride, other lanthanide compounds. Neutron sensitizing additives include additives such as organolithium compounds, organboron compounds, organogadolinium compounds and nanoparticles containing elements of lithium, boron, or gadolinium.

The conjugated liquid monomer or solution starting material is normally prepared at ambient temperature, but can also be parpared at an elevated temperature. A solvent may be employed to facilitate the formation of a transparent liquid solution. The solvent is subsequently removed.

The liquid solution can be cast into a thin film, thick layer, or placed in a mold, or a container, followed by bulk polymerization initiated by heating, ultraviolet light, or both, to form a transparent solid composite. A preferred embodiment of the invention is a bulk polymerization or copolymerization carried out in an inert environment such as nitrogen or argon gas.

The composite may be used for radiation scintillation under such radiations as an ultraviolet light, an x-ray, a gamma ray, a neutron source, a proton source, an alpha ray, positrons, and/or a beta ray.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes several embodiments of the materials and methods for producing transparent bulk conjugated polymers and organic scintillation composites of the present invention are depicted generally in FIG. 1 through FIG. 9 as well as the associated methods for using the products. It will be appreciated that the methods may vary as to the specific steps and sequence and the monomer and polymer architecture may vary as to structural details, without departing from the basic concepts as disclosed herein. The method steps are merely exemplary of the order that these steps may occur.

The steps may occur in any order that is desired, such that it still performs the goals of the claimed invention.

Organic scintillators are a class of materials that convert ionizing radiation energy deposited on the scintillator material into light. This emitted light can then be measured by photo-sensitive detectors. Scintillator polymer composites are used to illustrate the types of monomer compositions and additives that can be used to produce bulk polymer composites with desired characteristics.

Figure 1:
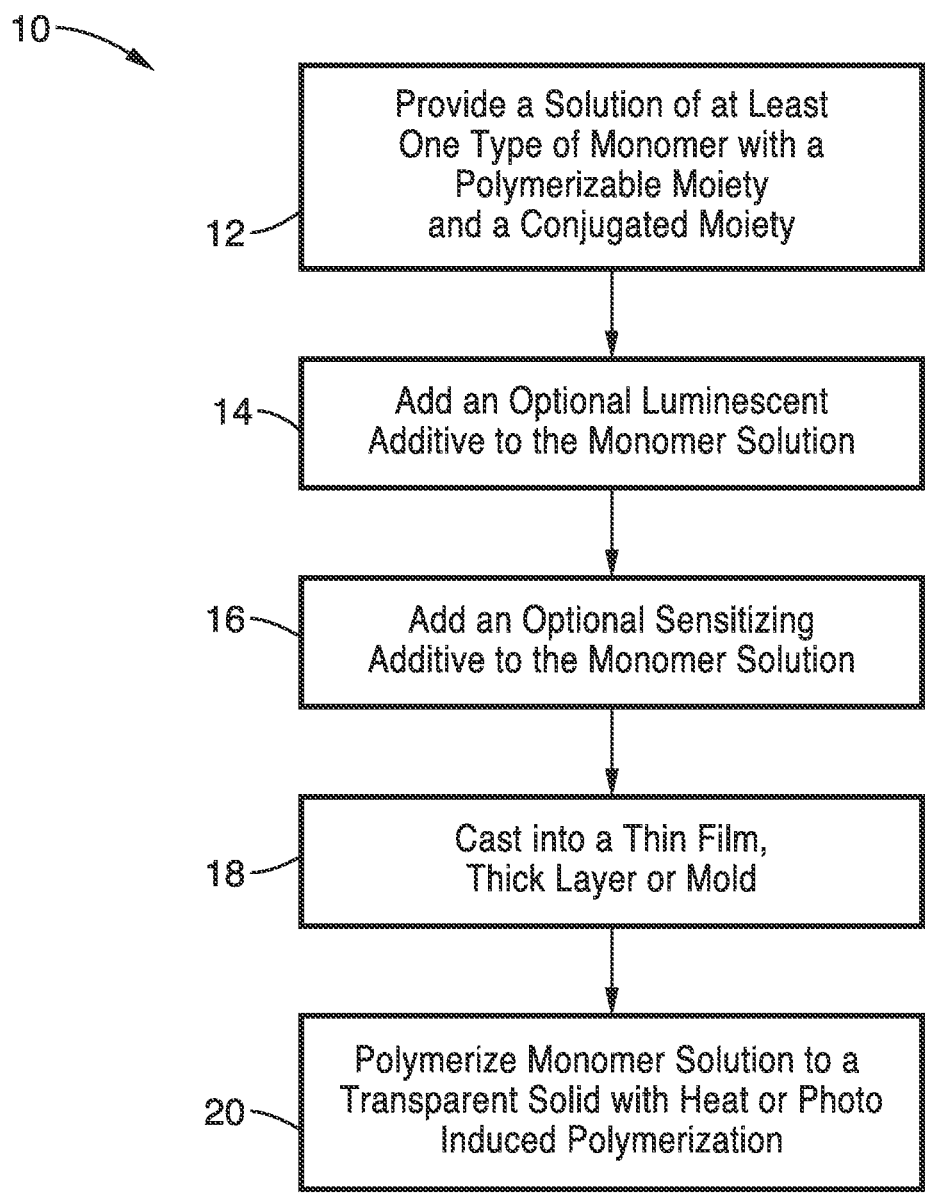
FIG. 1 is a flow diagram of a method for producing bulk polymer scintillation composites according to one embodiment of the invention.

By way of example, and not of limitation, FIG. 1 illustrates schematically a method 10 for producing bulk polymer composites from one or more conjugated monomers that have at least one polymerizable moiety and at least one conjugated moiety. At block 12, an initial solution of at least one type of monomer is provided. Particularly preferred monomers for scintillation materials are shown FIG. 3 and FIG. 4 and in Example 1 and Example 2 below. The monomers that are produced at block 12 have at least one polymerizable moiety and at least one conjugated moiety. In one preferred embodiment, the conjugated moiety has at least 15 pi-electrons conjugated together.

One example of such conjugated moieties include dimers, trimers, tetramers, pentamers, hexamers, and oligomers of fluorene. In this case, the hydrogen atoms on the 9-carbon of the fluorene unit are preferably each substituted by a functional group linked with the 9-C through a carbon atom.

Another example of a conjugated moiety includes trimers, and tetramers, pentamers, hexamers, and oligomers of phenylene. Others include triphenylamine, triarylamine, triphenyl silane, tetraphenylsilane, diphenyl-1,3,4-oxadiazole, diphenyltrazole, diphenyl benzothiadiazole, fluorenyl benzothiadiazole, fluorenyl thiphene, and difluorenyl thiophene. Derivatives of these conjugated moieties may also be used. Such derivatives include replacing some of the hydrogen atoms in the moiety with alkyl, alkoxy, phenyl, phenoxy and/or amino groups.

Alternative conjugated moieties include spirobifluorene and arylsilanes, where a silicon atom is bonded to at least two aryl groups. Various acenes, such as naphthalene, anthracene and their oligomers can also be used.

The polymerizable moiety of the monomer at block 12 is preferably selected from the group comprising acrylate esters, methacrylate esters, acrylic acid, methacrylic acid, acrylamide, methacrylamide, styrene, methyl styrene, epoxides, oxetanes and urethane-bond forming functional groups or a mixture thereof. The monomers may also contain one, two, or more polymerizable moieties.

Another embodiment of the starting material of the invention at block 12 of FIG. 1 is a solution comprising a first type of conjugated monomer and a second type of monomer preferably selected from the group consisting of acrylate esters, methacrylate esters, acrylic acid, methacrylic acid, acrylamide, methacrylamide, styrene, methyl styrene, dimethyl styrenes, substituted styrenes, various epoxides, and mixtures thereof. More than two types of monomers can also be used.

The conjugated liquid monomer solution starting material may be prepared at ambient temperature or at an elevated temperature. A solvent may be employed to facilitate the formation of a transparent liquid solution. The solvent is later removed upon polymerization.

At block 14 of FIG. 1, the intial solution of monomers can also include a luminescent additive to functionalize the final material. The luminescent additive may be selected from the group consisting of organic dyes, luminescent conjugated molecules, luminescent conjugated polymers, fluorescent organometallic compounds, phosphorescent organometallic compounds, luminescent quantum dots, and mixtures thereof.

At block 16, the initial monomer solution may also include a sensitizing additive to further functionalize the final composite. The sensitizing additive is incorporated into the final matrix and its selection will be influenced by the intended purpose of the composite. In the case of scintillator production, the sensitizing additives are preferably selected from the group consisting of high-energy photo sensitizing compounds, nanoparticles of compounds containing high atomic numbered atoms and neutron sensitizing additives. High-energy photo sensitizing additives include compounds such as organobismuth compounds, organolead compounds and barium compounds.

The sensitizing additive may also be nanoparticles of compounds containing high atomic numbered atoms such as bismuth oxide, bismuth fluoride, bismuth oxyfluoride, gadolinium oxide, gadolinium oxyfluoride, hafnium oxide, lutetium fluoride, and lanthanide compounds. Compounds containing atoms with atomic numbers of 52 or greater are preferred high atomic number sensitizing additives.

Neutron sensitizing additives, such as organolithium compounds, organoboron compounds, organogadolinium compounds can be used as well as nanoparticles containing elements of lithium, boron, or gadolinium are also useful sensitizing additives.

The embodiment shown in FIG. 1 produces an initial solution consisting of at least one conjugated monomer, a luminescent additive, and a sensitizing additive. However, combinations of multiple monomers alone, monomers and a luminescent additive, monomers and a sensitizing additive and multiple monomers with luminescent or sensitizing additives can also be used.

The liquid solution of monomers and additives may be cast into a thin film, thick layer or placed into a mold or a container at block 18 of the scheme of FIG. 1.

Bulk polymerization at block 20 of FIG. 1 is initiated form a transparent solid composite. The monomer can be polymerized by heating to an elevated temperature with or without the addition of an initiator. Alternatively, the monomer can be polymerized by photo-induced polymerization with ultraviolet light, for example. An optional photoinitiator added to the initial solution may be employed to initiate the photopolymerization in this case.

Figure 2:
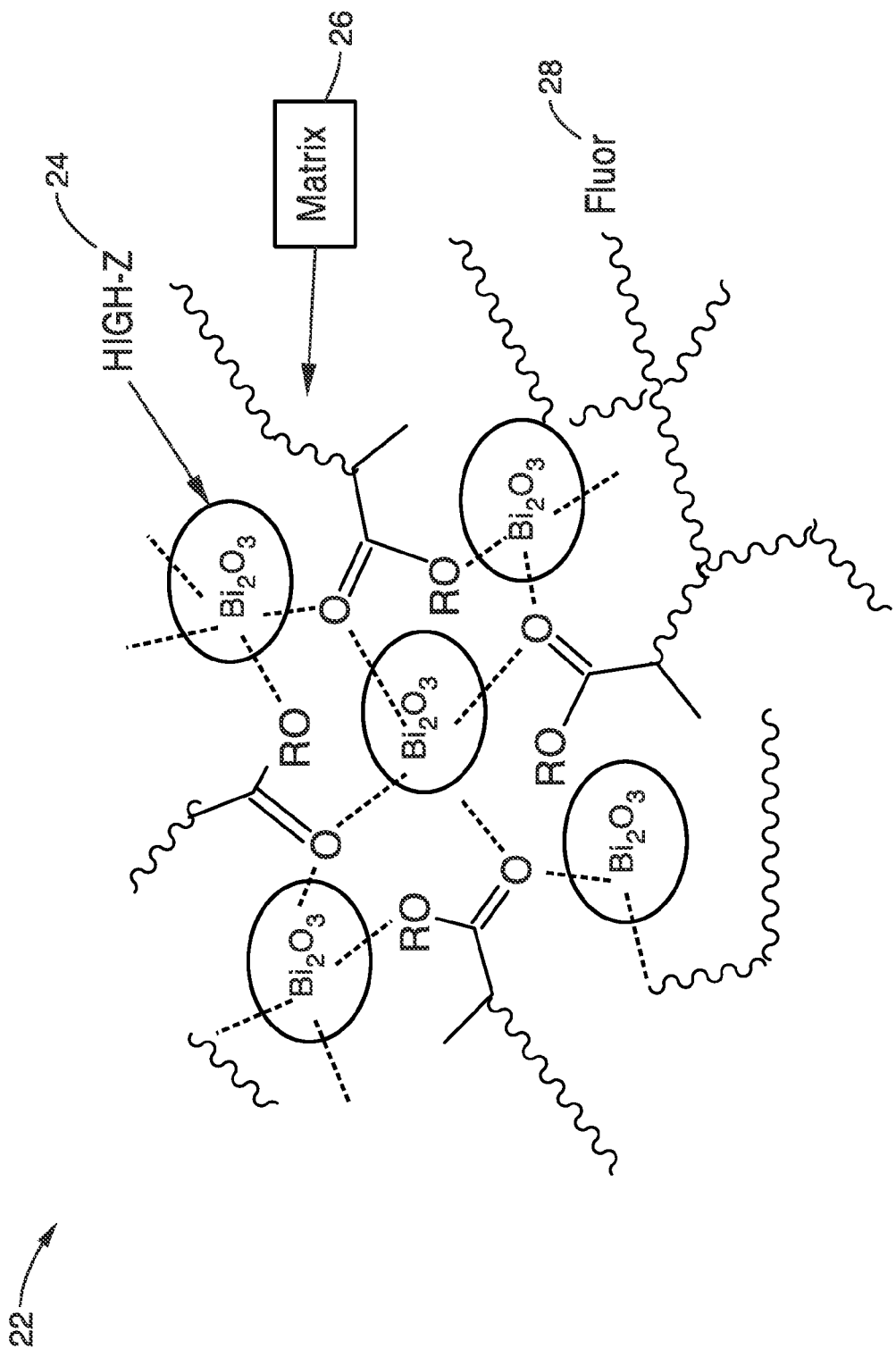
FIG. 2 is a schematic diagram of a gamma scintillation composite with a high Z additive and organic luminescence according to the invention.

The final polymerized product can be removed from the mold or left in place if applied as a coating. The material may also be subject to post synthesis processing such as polishing or can be sized for a particular apparatus or application. As seen in FIG. 2, a polymerized matrix 22 of polymers 26, sensitizing molecules 24 and luminescent molecules 28 is produced.

Unlike conventional organic scintillators such as polystyrene that have a low effective Z and low polymerization efficiency, the composite shown in FIG. 2 with a high-Z sensitizing additive 24 and organic luminescence additive 26 produces a scintillator with superior performance characteristics. (See the comparisons of FIG. 9). Composites produced with the methods can be used for radiation scintillation under radiations such as ultraviolet light, x-rays, gamma rays, a neutron source, a proton source, alpha rays, positrons, and/or a beta rays.

The invention may be better understood with reference to the accompanying examples, which are intended for purposes of illustration only and should not be construed as in any sense limiting the scope of the present invention as defined in the claims appended hereto.

Example 1

TFS Synthesis

Figure 3:
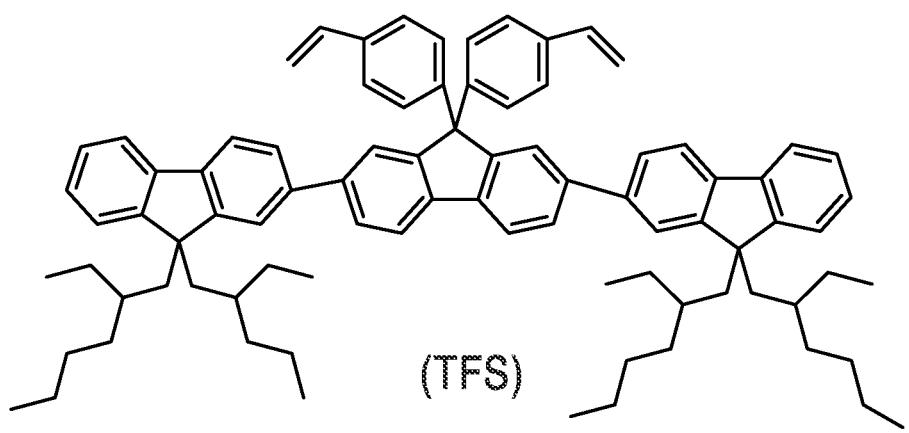
FIG. 3 is the chemical structure of 4,7-bis{2'-9',9'-bis[(2"-ethylhexyl)-fluorenyl]}-9,9-bis(4'-vinylbenzyl)-fluorene (TFS).

A conjugated fluorine trimer, 4,7-bis{2'-9',9'-bis[(2"-ethylhexyl)-fluorenyl]}-9,9-bis(4'-vinylbenzyl)-fluorene (TFS), was synthesized to illustrate a possible monomer unit with at least one conjugated moiety and at least one polymerizable moiety. The structure of the final TFS oligomer is shown in FIG. 3.

Synthesis of the 2-bromo-9,9-bis(2-ethylhexyl)-9H-fluorene Intermediate

In a round bottom flask, 4.91 g of 2-bromofluorne and 0.05 g of tetra-n-butylammonium bromide were dissolved in 31 mL of DMSO. To this mixture was added 15.0 g of a 50% wt/v of NaOH solution. Upon addition of 10.7 mL of 2-ethylhexyl bromide, the solution achieved a red color which darkened over time as it was stirred at room temperature for a period of 3 days. The reaction mixture was then poured into water and extracted three times with diethyl ether. The organic solution was dried over $MgSO_4$ and concentrated by rotary evaporator. Crude 2-bromo-9,9-bis (2-ethylhexyl)-9H-fluorene product was purified in a flash column using hexane as the eluent. The product was dried by rotary evaporation and high vacuum to recover 7.21 g (15.4 mmol) of pure product. Percent yield was 76.4%.

Synthesis of 2-[4,4,5,5-tetramethyl-1,3,2-dioxaborolane]-9,9-bis(2-ethylhexyl)-9H-fluorene Intermediate A round bottom flask was charged with 6.14 g (13.08 mmol) of 2-bromo-9,9-bis(2-ethylhexyl)-9H-fluorene. The compound was dissolved in 50 mL of dry THF and then stirred at −78° C. To the stirring solution was added 6.48 mL of 2.5M n-butyllithium in hexanes and 4.8 mL (23.5 mmol) of 2-isopropoxy-4,4,5,5-tetramethyl-1,3,2-dioxaborolane. The reaction mixture was stirred overnight while allowing it to come down to room temperature. The reaction mixture was poured into deionized water and was extracted with diethyl ether and washed with a saturated NaCl solution. The organic layers were then dried over $MgSO_4$, filtered, and concentrated by rotary evaporator. The product was purified on a silica gel dry vacuum column. The purification yielded 5.06 g (9.79 mmol) of pure product. Percent yield was 74.8%.

Trifluorene Oligomer Synthesis

A sample of 5.01 grams of 2-[4,4,5,5-tetramethyl-1,3,2-dioxaborolane]-9,9-bis(2-ethylhexyl)-9H-fluorene was dissolved in 23 mL of tetrahydrofuran. To the sample solution was added 3.6 g of $K_2CO_3$ in 13.2 g of water and 1.42 g of 2,7-dibromofluorene. A catalytic amount of $Pd(PPh_3)_4$ was also added to the mixture. The solution was degassed by a freeze-pump-thaw technique and stirred overnight at 50° C. The aqueous and organic layers were then separated and the aqueous layer was extracted with diethyl ether. The combined organic layers were washed with a saturated NaCl solution. The organic layer was dried over $MgSO_4$, filtered, and the solvent was removed by rotary evaporator and high vacuum. The product was purified on a silica gel dry vacuum column with hexanes/DCM as the eluent. Solvent was removed with a rotary evaporator and high vacuum and 3.3 g of pure product was obtained. Percent Yield was 79.2%.

Synthesis of the Trifluorene Oligomer with Styryl Groups

A round bottom flask was charged with a 0.5 g sample of the trifluorene oligomer and 0.26 g of 4-vinyl benzyl chloride. The compounds were dissolved in anhydrous tetrahydrofuran and stirred under an argon atmosphere. Then 0.37 g of potassium tert-butyl oxide was added to the reaction. The reaction was stirred under argon at room temperature for about 24 hours. The reaction mixture was poured into deionized (DI) water and extracted with diethyl ether. The organic layers were washed with DI water and then dried, filtered, and the solvent was removed by rotary evaporator. The product was purified on a silica gel flash column. Percent yield was 61%.

Figure 5:
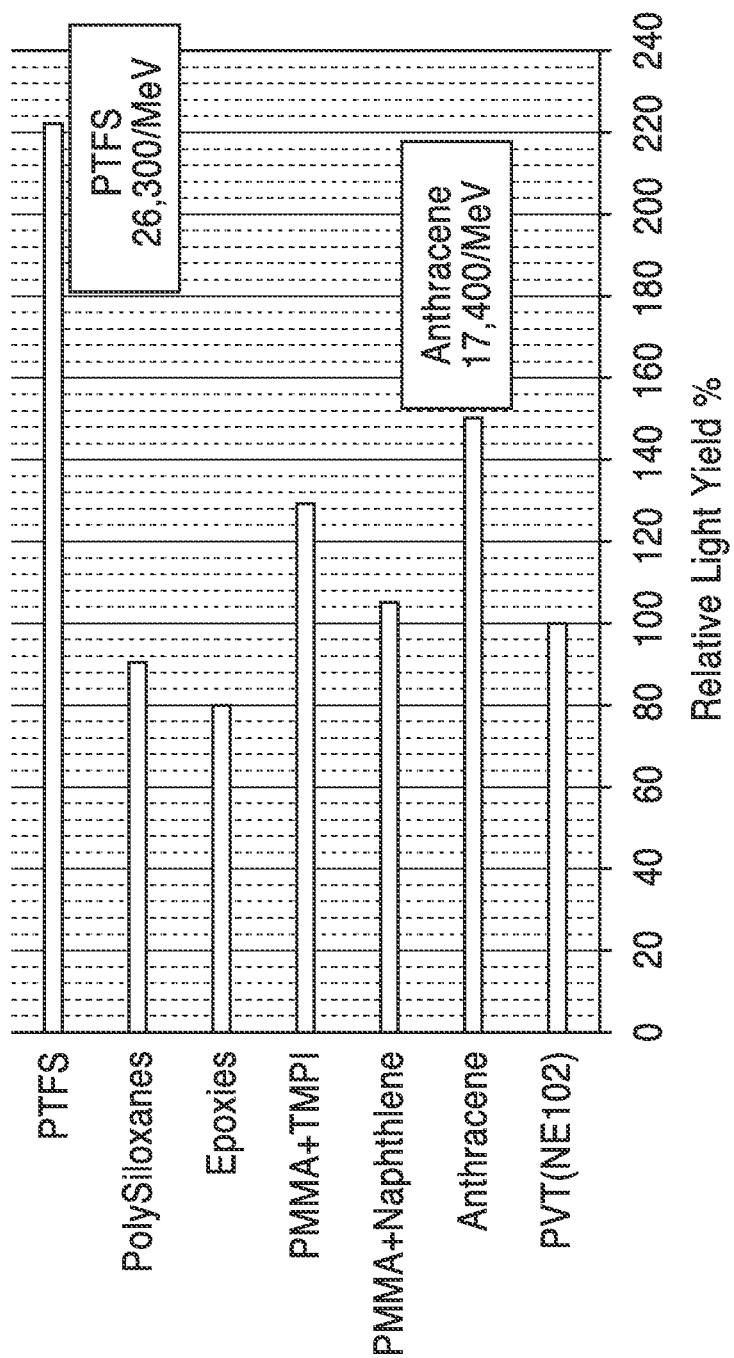
FIG. 5 is a graph plotting the relative light yield for several different matrices showing the substantial light yield performance of TFS.

The relative light yield of a TFS scintillator was compared with that of other materials and the performance results are shown in FIG. 5.

Example 2

DFS Synthesis

Figure 4:
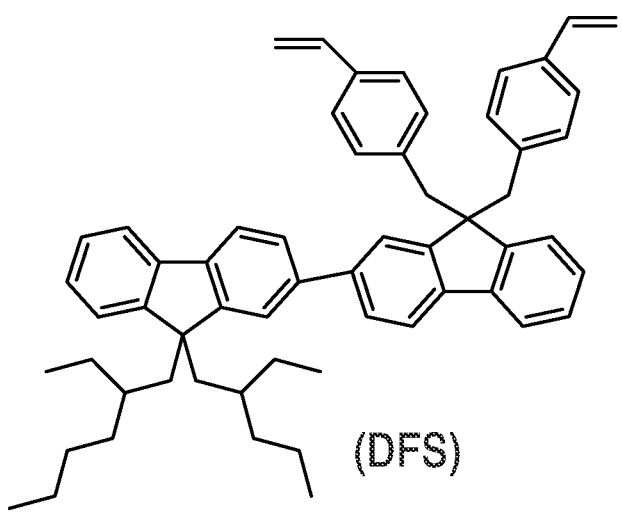
FIG. 4 is the chemical structure of 4-{2'-9',9'-bis[(2"-ethylhexyl)-fluorenyl]}-9,9-bis(4'-vinylbenzyl)-fluorene (DFS).

A second monomer unit was synthesized with structure of 4-{2'-9',9'-bis[(2"-ethylhexyl)-fluorenyl]}-9,9-bis(4'-vinylbenzyl)-fluorene ("DFS") to illustrate the invention. The structure of the final DFS oligomer is shown in FIG. 4.

Synthesis of a 2-bromo-9,9-di(2-ethylhexyl)-fluorene Intermediate

To a mixture of 9.8 g (40.0 mmol) of 2-bromofluorene and 0.1 g of tetra-n-butylammonium bromide in 50 mL of DMSO was added 30 g of a 50 wt % solution of aqueous potassium hydroxide, followed by 21.4 mL (120.0 mmol) of 2-ethylhexyl bromide. The resulting dark red reaction mixture was stirred at room temperature for 3 days. Reaction progress was monitored via thin layer chromatography (TLC) with hexane as eluent, and visualized via UV light. The reaction mixture was then poured into 200 mL of a saturated sodium chloride solution, and the mixture was extracted with 3×100 mL volumes of ethyl ether. The combined organic phases were washed with 2×100 mL volumes of $H_2O$, and 100 mL of diluted HCl. The organic phase was dried over magnesium sulfate, and the solvent was removed under vacuum. Excess 2-ethylhexyl bromide was removed via vacuum distillation, and the remaining oil was purified via flash chromatography with hexane as eluent. 14.9 g (79% yield) of 2-bromo-9,9-di(2-ethylhexyl)-fluorene as an orange oil was obtained, which was a mixture of diastereomers.

A 17.33 g (154 mmol) quantity of potassium tert-butoxide was mixed with a solution of 7.25 g (15.4 mmol) of 2-bromo-9,9-di(2-ethylhexyl)-fluorene in 75 mL of tetrahydrofuran (freshly distilled from sodium/benzophenone). The mixture was stirred at room temperature for 30 minutes and then filtered through a plug of basic alumina, which was eluted with tetrahydrofuran. The solvent was removed under vacuum, and the residue was redissolved in hexane. The excess potassium tert-butoxide was filtered off, and the solvent was removed under vacuum to give 6.07 grams of 2-bromo-9,9-di(2-ethylhexyl)-fluorene. An 83.7% recovery was obtained, free of mono- and unsubstituted impurities.

Synthesis of a 2-[9,9-bis(2-ethylhexyl)-fluoren-2-yl]-4,4,5,5-tetramethyl-1,3,2-dioxaborolane Intermediate A solution of 5.00 g (10.6 mmol) of the 2-bromo-9,9-bis(2-ethylhexyl)-9H-fluorene intermediate in 22 mL of dry tetrahydrofuran was cooled to −78° C. in a dry-ice/acetone bath. 5.28 mL (13.2 mmol) of 2.5M n-butyllithium in hexane was added dropwise to the solution. After stirring for 1 hour at −78° C., 3.9 mL of 2-isopropoxy-4,4,5,5-tetramethyl-1,3,2-dioxaborolane was added and the reaction mixture was slowly warmed to room temperature and stirred overnight. The reaction mixture was then poured into 50 mL of a saturated sodium chloride solution and the mixture was extracted with 3×30 mL volumes of ethyl ether. The combined organic layers were washed with 2×25 mL of $H_2O$ and 25 mL of saturated sodium chloride solution and then dried over magnesium sulfate. The solvent was removed under vacuum and the crude product was purified via flash column chromatography (hexane:dichloromethylene=5:1). A 3.47 g (63% yield) of a viscous oil that was a mixture of diastereomers was obtained.

Synthesis of 2-{(9',9'-bis[(2''-ethylhexyl)-fluoren-2'-yl])}fluorine Intermediate A sample of 13.85 g (26.8 mmol) of the 2-[9,9-bis(2-ethylhexyl)-fluoren-2-yl]-4,4,5,5-tetramethyl-1,3,2-dioxaborolane intermediate and 6.58 g (26.8 mmol) of 2-bromofluorene were dissolved in 60 mL THF and then 10 g $K_2CO_3$ in 36 g $H_2O$ and 0.6 g $Pd(PPh_3)_4$ was added to the solution. The mixture was degassed via a freeze-pump-thaw technique and was stirred at 50° C. for 48 hours. The reaction mixture was removed from heat and cooled to room temperature. The aqueous and organic layers were separated and the aqueous layer was extracted with three times 70 mL volumes of diethyl ether. The combined organic layers were washed with a combination of 60 mL deionized $H_2O$ and 30 mL saturated sodium chloride. The organic layer was dried over $MgSO_4$, filtered, and the solvent was removed by rotary evaporator and high vacuum.

The 2-{9',9'-bis[(2''-ethylhexyl)-fluoren-2'-yl]}fluorene product was purified on a silica gel flash column run with (Hexanes:Dichloromethylene=10:1) as the eluent. Solvent was removed on rotary evaporator and high vacuum and 10.9 g (73% yield) of pure intermediate product was isolated.

Synthesis of the 4-{2'-9',9'-bis[(2''-ethylhexyl)-fluorenyl]}-9,9-bis(4'-vinylbenzyl)-fluorene (DFS) Product A round bottom flask was charged with 10.9 g (19.7 mmol) of the 2-{9',9'-bis[(2''-ethylhexyl)-fluoren-2'-yl]}-fluorine intermediate and 8.9 g (60 mmol) of 4-vinyl benzyl chloride. The compounds were dissolved in anhydrous THF and stirred under an argon atmosphere. To the flask was added a solution of 0.4 g (0.22 mmol) of KI and 0.4 g (0.14 mmol) of 18-Crown-6 in 5 mL of DMSO. The reaction solution was stirred under an argon atmosphere at room temperature for about 1 hour. Upon the addition of 8 g (83 mmol) of sodium tert-butoxide to the reaction, the mixture turned dark green in color before slowly returning to red. The mixture was then stirred under the argon atmosphere at room temperature for about 24 hours. The reaction mixture was poured into 100 mL of deionized $H_2O$ and extracted with three times 70 mL volumes of diethyl ether. The organic layers were washed with 50 mL of diluted HCl and turned from a red to a pale yellow color. The organic solution was dried, filtered, and the solvent was removed by rotary evaporator. The product was purified on a silica gel flash column, using an eluent of Hexanes:Dichloromethylene=8:1. The product was stirred with 5 equivalents of potassium tert-butyl oxide for about 20 minutes in dry tetrahydrofuran, and purified on an alumina oxide plug eluted with dry THF. The solvent was removed by rotary evaporator and high vacuum and 0.44 grams of pure final product was obtained representing a 70% yield.

Example 3

FBtF Synthesis

A sample of 4 grams of the as-prepared 2-[4,4,5,5-tetramethyl-1,3,2-dioxaborolane]-9,9-bis(2-ethylhexyl)-9H-fluorene was dissolved in 50 mL of tetrahydrofuran. To this solution was added 4.1 g of $K_2CO_3$ in 15 g of water and 1 g of 4,7-Dibromobenzo[c]-1,2,5-thiadiazole. A catalytic amount of $Pd(PPh_3)_4$ was then added. The solution was degassed with the use of a freeze-pump-thaw technique and stirred overnight at 50° C. The aqueous and organic layers were separated and the aqueous layer was extracted with diethyl ether. The combined organic layers were washed with a saturated NaCl solution. The organic layer was then dried over $MgSO_4$, filtered, and the solvent was removed by rotary evaporator and high vacuum. The product was then purified on a silica gel dry vacuum column with Hexanes/DCM as the eluent. Solvent was removed on a rotary evaporator at high vacuum and 2.5 g of pure product was isolated. Percent yield was 81%.

Example 4

$Gd_2O_3$ Nanoparticle Synthesis 2.5 g of gadolinium (III) acetate hydrate was added into 6.5 g of oleic acid and 4.3 g of oleylamine and placed into a three-necked flask with capacity of 100 ml at room temperature. Then the resulting slurry was heated to 110-150° C. with vigorous magnetic stirring under vacuum for 1 hour. The slurry was then heated to 320° C. under an argon atmosphere for 25 minutes and kept for 1 hour. The mixture was cooled to room temperature by compressed air. The final white products were obtained by adding acetone into the reacted solution and then centrifuging. The obtained gadolinium oxide nanocrystals were then washed with ethanol, centrifuged and vacuumed for 4 hours to remove the residual solvent. The final products weighed 1.5 grams.

A 0.9 g of the as-prepared $Gd_2O_3$ nanoparticles were dispersed in 30 ml of a chloroform solution of bis[2-(methacryloyloxy)-ethyl]phosphate (BMEP) (5 wt %). The resulting mixture was stirred overnight. The chloroform was removed by rotary evaporation to obtain the BMEP capped $Gd_2O_3$ nanoparticles. The viscous solid was washed by 40 ml of ethanol and centrifuged, and the white product was dried in vacuum for several hours. BMEP caption was verified by IR spectrum. TGA analysis showed 40% by weight of capping agents attached on the $Gd_2O_3$ nanoparticles.

Example 5

$Bi_2O_3$ Nanoparticle Synthesis

Bismuth acetate (0.77 g), oleic acid (1.9 g), and phenyl ether (3 mL) were mixed and magnetically stirred while being heated to 110° C. The resulting milky fluid was kept in a vacuum for 1 hour. Afterwards, oleyl amine (5 mL) was filled in a flask and heated up to 280° C. under a blanket of argon. The as-prepared hot milky mixture was then injected into the oleyl amine. This mixture was kept for another 3 minutes at 260° C., and then it was cooled to room temperature by compressed air. Under ambient conditions, acetone (20 mL) was added to the mixture to get the milky mixture. After precipitating for 15 minutes, the solid was separated by centrifugation, and re-dissolved in toluene. The brownish product contained 0.2 grams of $Bi_2O_3$ nanoparticles and was obtained by precipitation with acetone, centrifugation and being placed under vacuum for 4 hours to remove the residual solvent.

Example 6

$HfO_2$ Nanoparticle Synthesis

For the $HfO_2$ nanoparticle synthesis, 2.7 g of hafnium chloride and 12 g of oleic acid were mixed and magnetically stirred and heated to 110° C. The milky mixture was kept in vacuum for 1 hour to distillate the resulting hydrochloric acid. Afterwards, 16 grams of Oleylamine were added into the mixture and heated up to 270° C. under a blanket of argon. 15 minutes later, the mixture was heated up again to 330° C. for another 40 minutes and then cooled to room temperature by compressed air. The as-prepared mixture was centrifuged to get the viscous solution. Then 8 g of oleic acid was added and the mixture was stirred at 60° C. for 2 hours. Then acetone (120 mL) was added to the mixture followed by centrifugation to obtain white solids, which were re-dissolved in toluene. The hafnium oxide nanocrystals were obtained by precipitation with ethanol, centrifugation and vacuum for 4 hours to remove the residual solvent. The final product weighed 0.5 grams.

Example 7

Pure TFS Plastic Scintillators Fabricated by Thermal Curing 200 mg of TFS was dissolved in toluene together with 5.5 mg of the as-prepared dopant (FBtF) in a vial that had a diameter of 1 cm. After sufficient sonication, the mixture was left in the open air for evaporation of the toluene to form a gel product containing less than 10 wt % of residual solvents. The vial was transferred into a glovebox and then heated at 60° C. for 2 hours to remove all of the solvents. Then the temperature was increased to 130° C. for 4 hours then kept at 90° C. overnight. The as-prepared sample was obtained by breaking the vial and further polishing of the sample was conducted.

Example 8

TFS/Styrene Copolymer Scintillators Fabricated by Thermal Curing 200 mg of TFS was dissolved in 1 g of styrene together with 7 mg of the as-prepared dopant (FBtF) in a vial that had a diameter of 1 cm. After sufficient sonication, the mixture was left in the open air for evaporation to form a gel containing residual styrene, e.g., 50 mg. The vial was transferred into a glovebox and the temperature was increased to 130° C. for 4 hours and then kept at 90° C. overnight. The as-prepared sample was obtained by breaking the vial and further polishing was employed. The light yield of sample upon beta ray irradiation was measured as 20,880/MeV.

Example 9

TFS/Styrene/Triphenyl Bismuth Composite Scintillators Fabricated by Thermal Curing 200 mg of TFS was dissolved in 1 g of styrene together with 8.5 mg of the as-prepared dopant (FBtF) and 100 mg of triphenyl bismuth in a vial that had a diameter of 1 cm. After sufficient sonication, the mixture was left in the open air for evaporation to form a gel with 100 mg of residual styrene. The vial was then transferred into a glovebox and heated at 60° C. for 2 hours. Thereafter, the temperature was increased to 130° C. for 4 hours then kept at 90° C. overnight. The as-prepared sample was obtained by breaking the vial and further polishing was employed.

Example 10

TFS/Styrene/Tristyryl Bismuth Composite Scintillators Fabricated by Thermal Curing 1.83 g of 4-bromostyrene was dissolved in 20 mL of dry THF and then 0.273 g of Mg was added to the reaction vessel. When the reaction started, the mixture was cooled in an ice bath for 3 hours under an argon atmosphere. 1.05 g of bismuth chloride was added afterwards, and the mixture was kept at 0° C. for 3 hours and then room temperature for 2 hours. 20 mL of water was added to quench the reaction and the resulting mixture was extracted by toluene. The raw product was sent through a column with DCM/hexane as eluent. A yellowish solid of tristyrylbismuth was obtained.

200 mg of TFS was then dissolved in 1 g of styrene together with 8.5 mg of the as-prepared dopant (FBtF) and 100 mg of as-prepared tristyryl bismuth in a vial with a diameter of 1 cm. After sufficient sonication, the mixture was left in the open air for evaporation and to form a gel with 100 mg of residual styrene. The vial was transferred into a glovebox and then heated at 60° C. for 2 hours. Then the temperature was increased to 130° C. for 4 hours then kept at 90° C. overnight. The as-prepared sample was obtained by breaking the vial and further polishing was employed. The light yield of the sample was 26,567/MeV and the energy spectrum up irradiation by Cs-137 was obtained.

Figure 6:
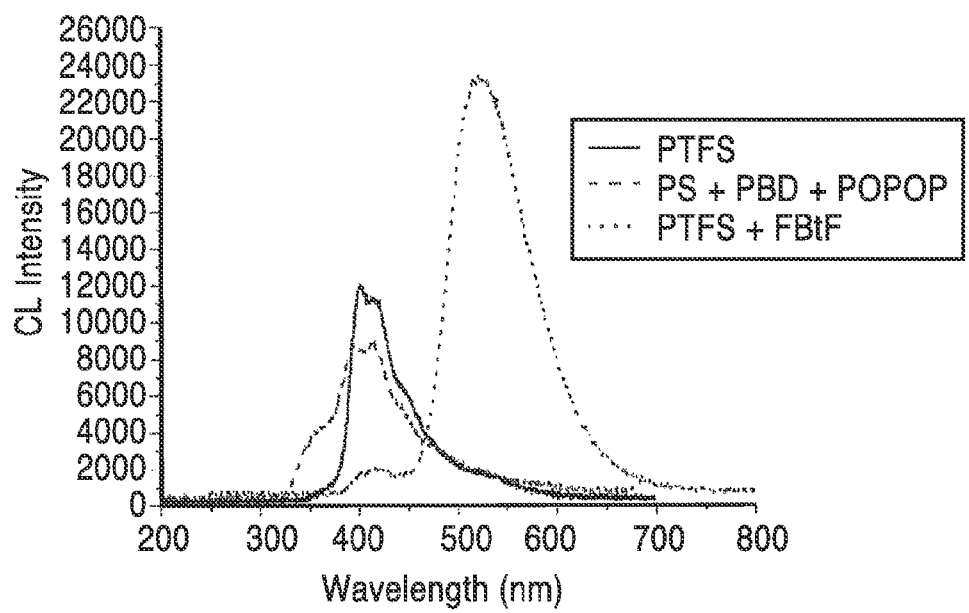
FIG. 6 is a graph plotting intensity versus wavelength for comparison of PS and PTFS composites.
Figure 7:
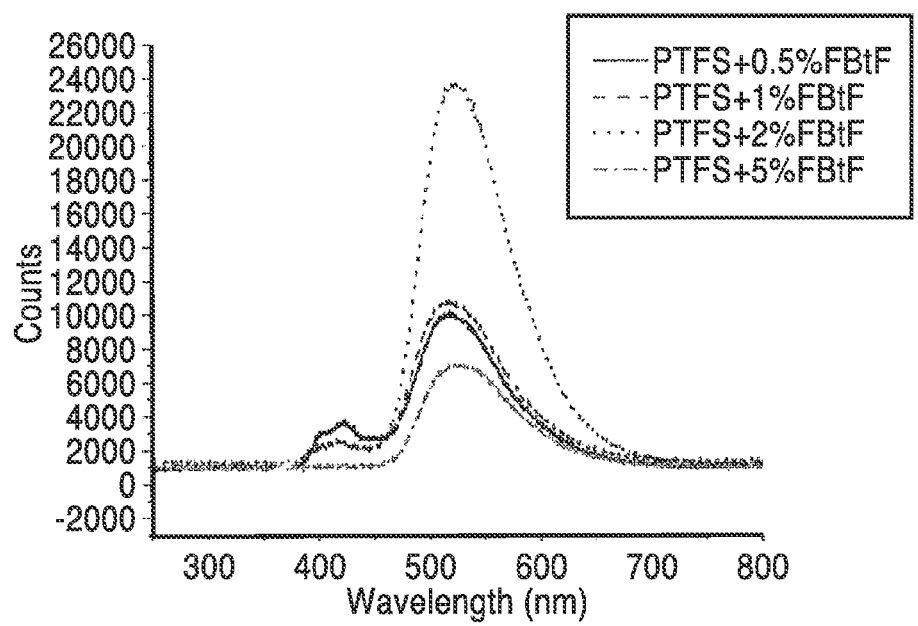
FIG. 7 is a graph plotting counts versus wavelength for comparison of PTFS composites with different percentages of FBtF.

FIG. 6 is a graph plotting intensity versus wavelength for comparison of PS and PTFS composites. FIG. 7 is a graph plotting counts versus wavelength for comparison of PTFS composites with different percentages of FBtF.

Example 11

TFS/Styrene/$Gd_2O_3$ Nanocomposite Scintillators Fabricated B Thermal Curing 146 mg of TFS was dissolved in 200 mg of styrene together with 9 mg of the as-prepared dopant (FBtF), 36 mg of the as-prepared $Gd_2O_3$ nanoparticles and 0.7 mg of AIBN in a vial with a diameter of 1 cm. After sufficient sonication, the optically clear mixture was transferred into a glovebox and then heated at 60° C. for 2 hours. Then the temperature was increased to 130° C. for 4 hours and then kept at 90° C. overnight. The as-prepared sample was obtained by breaking the vial and further polishing was employed.

Example 12

TFS/Styrene/Bi$_2$O$_3$ Nanocomposite Scintillators Fabricated by UV Curing 50 mg of TFS was dissolved in 200 mg of styrene together with 5.5 mg of the as-prepared dopant (FBtF) and 100 mg of dried Bi$_2$O$_3$ nanoparticles in a vial with a diameter of 1 cm. After sufficient sonication, the mixture was transferred into a glovebox and exposed to UV radiation for 60 hours to ensure that the product was fully cured. The resulting transparent sample was obtained by breaking the glass vial.

Example 13

TFS/Styrene/HfO$_2$ Nanocomposite Scintillators Fabricated by UV Curing 50 mg of TFS was dissolved in 200 mg styrene together with 5.5 mg of as-prepared dopant (FBtF) and 100 mg of dried HfO$_2$ nanoparticles in a vial with a diameter of 1 cm. After sufficient sonication, the mixture was transferred into a glovebox and exposed to UV for 60 hours to get a fully cured product. The resulting transparent sample was obtained by breaking the glass vial.

Example 14

DFS/Vinyltoluene Copolymer Scintillators Fabricated By Thermal Curing 300 mg of DFS and 100 mg of vinyltoluene was mixed together with 7 mg of dopant [poly(9,9-dihexyl-fluorene-2,7-diyl)] in a vial with a diameter of 1 cm. After sufficient sonication, the vial was transferred into a glovebox and the temperature was increased to 130° C. for 4 hours and then kept at 90° C. for 48 hrs. The as-prepared sample was obtained by breaking the vial and further polishing was employed. The sample was tested successfully for beta ray detection and gamma/neutron pulse shape discrimination.

Example 15

Pulse Shape Discrimination (PSD)

The TFS/Styrene/Triphenyl Bismuth Composite Scintillators fabricated in (Example 8) were employed to study the PSD technique, which allows for the separation of the scintillation pulses produced by neutron and gamma events via the relative increase in the delayed light for neutron stimulations. The composite scintillator was coupled with PMT and irradiated Cf-252 source shielded with 5.1 cm of lead to achieve the results shown in FIG. 8 and FIG. 9.

Figure 8:
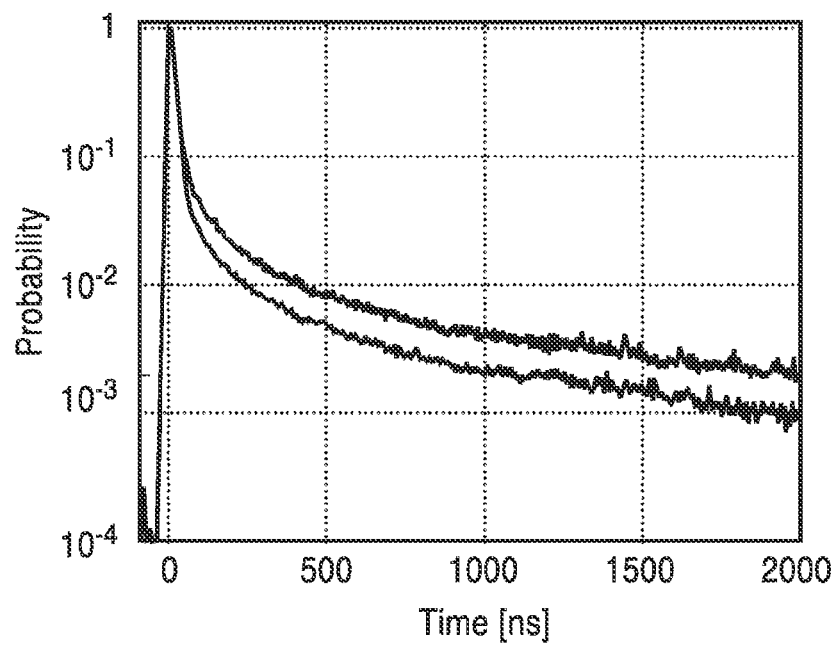
FIG. 8 is a graph of neutron and gamma scintillation pulses of Example 8 upon irradiation of Cf-252.
Figure 9:
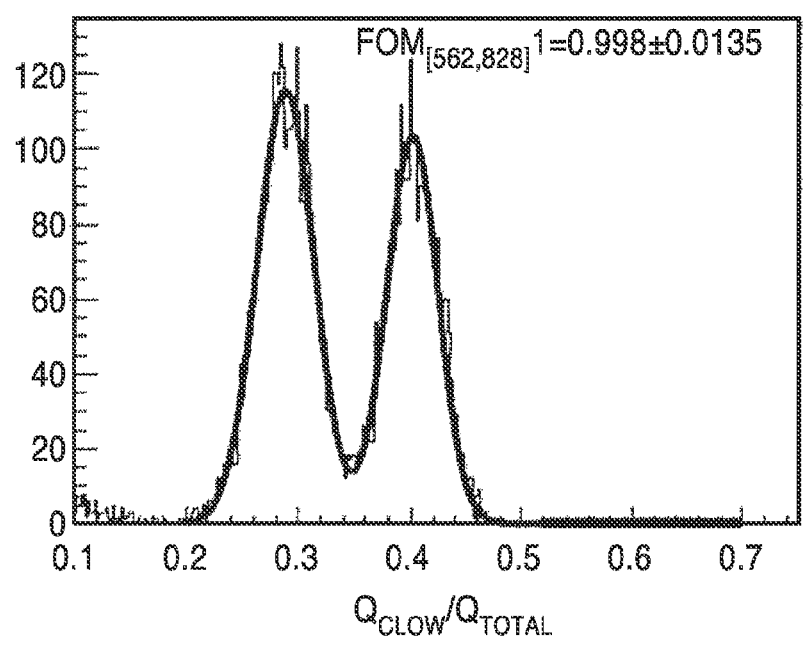
FIG. 9 is a pulse shape discrimination (PSD) profile of experimental data used for calculating the PSD figure of merit (FOM) of the material of Example 8.

FIG. 8 is a graph of neutron and gamma scintillation pulses of Example 8 upon irradiation of Cf-252. FIG. 9 is a pulse shape discrimination (PSD) profile of experimental data used for calculating the PSD figure of merit (FOM) of the material of Example 8.

From the discussion above it will be appreciated that the invention can be embodied in various ways, including the following:

1. A method of producing a bulk polymer scintillating material, comprising: (a) providing a solution of monomers that have at least polymerizable moiety and at least one conjugated moiety; and (b) polymerizing the monomer solution to produce a solid.

2. The method as recited in any previous embodiment, wherein the conjugated moiety of the monomer comprises at least 15 pi-electrons conjugated together.

3. The method as recited in any previous embodiment, wherein the conjugated moiety of the monomer comprises a dimer, trimer, tetramer, pentamer, hexamer, or oligomer of fluorene.

4. The method as recited in any previous embodiment, wherein the conjugated moiety of the monomer comprises a trimer, tetramer, pentamer, hexamer, or oligomer of phenylene.

5. The method as recited in any previous embodiment, wherein the conjugated moiety of the monomer is selected from the group consisting of triphenylamine, triarylamine, triphenyl silane, tetraphenylsilane, diphenyl-1,3,4-oxadiazole, diphenyltrazole, diphenyl benzothiadiazole, fluorenyl benzothiadiazole, fluorenyl thiphene, and difluorenyl thiophene.

6. The method as recited in any previous embodiment, wherein the polymerizable moiety of the monomer is selected from the group consisting of acrylate esters, methacrylate esters, acrylic acid, methacrylic acid, acrylamide, methacrylamide, styrene, methyl styrene, epoxides, oxetanes and urethane forming functional groups.

7. The method as recited in any previous embodiment, wherein the monomer comprises 4,7-bis{2'-9',9'-bis[(2"-ethylhexyl)-fluorenyl]}-9,9-bis(4'-vinylbenzyl)-fluorene (TFS).

8. The method as recited in any previous embodiment, wherein the monomer comprises 4-{2'-9',9'-bis[(2"-ethylhexyl)-fluorenyl]}-9,9-bis(4'-vinylbenzyl)-fluorene (DFS).

9. The method as recited in any previous embodiment, wherein the solution of monomers comprises: a first monomer with at least one conjugated moiety; and at least one second monomer selected from the group of monomers consisting of acrylate esters, methacrylate esters, acrylic acid, methacrylic acid, acrylamide, methacrylamide, styrene, methyl styrene, dimethyl styrenes, substituted styrenes, oxetanes and epoxides.

10. The method as recited in any previous embodiment, further comprising: adding a luminescent additive to the solution of monomers before polymerization.

11. The method as recited in any previous embodiment, wherein the luminescent additive is an additive selected from the group consisting of organic dyes, luminescent conjugated molecules, luminescent conjugated polymers, fluorescent organometallic compounds, phosphorescent organometallic compounds, luminescent quantum dots, and mixtures thereof.

12. The method as recited in any previous embodiment, further comprising: adding a sensitizing additive to the solution of monomers before polymerization.

13. The method as recited in any previous embodiment, wherein the sensitizing additive is an additive selected from the group consisting of high-energy photo sensitizing compounds, nanoparticles of compounds containing atoms with atomic numbers greater than 52 and neutron sensitizing additives.

14. The method as recited in any previous embodiment, wherein the high-energy photo sensitizing compound is selected from the group consisting of organobismuth compounds, organolead compounds, and barium compounds.

15. The method as recited in any previous embodiment, wherein the nanoparticles of compounds containing high atomic numbered atoms is selected from the group consisting of bismuth oxide, bismuth fluoride, bismuth oxyfluoride, gadolinium oxide, gadolinium oxyfluoride, hafnium oxide, and lutetium fluoride.

16. The method as recited in any previous embodiment, wherein the neutron sensitizing additives are selected from the group consisting of organolithium compounds, organoboron compounds, organogadolinium compounds, nanoparticles containing lithium, nanoparticles containing boron and nanoparticles containing gadolinium.

17. The method as recited in any previous embodiment, further comprising: adding an initiator to the solution to initiate polymerization.

18. A method of producing an organic scintillator, comprising: (a) providing a formulation comprising: (i) conjugated polymer molecules with a plurality of polymerizable and conjugated moieties; and (ii) a luminescent additive; and (iii) a sensitizing additive; (b) casting the formulation; and (c) polymerizing the formulation with heat or photoinduced polymerization to form a solid scintillator.

19. The method as recited in any previous embodiment, further comprising: polymerizing the formulation in an inert environment of nitrogen gas or argon gas.

20. The method as recited in any previous embodiment, wherein the luminescent additive is an additive selected from the group consisting of organic dyes, luminescent conjugated molecules, luminescent conjugated polymers, fluorescent organometallic compounds, phosphorescent organometallic compounds, luminescent quantum dots, and mixtures thereof.

21. The method as recited in any previous embodiment, wherein the sensitizing additive is an additive selected from the group consisting of high-energy photo sensitizing compounds, nanoparticles of compounds containing atoms with atomic numbers greater than 52 and neutron sensitizing additives.

22. A monomer for producing a bulk polymer scintillating material, the monomer comprising: 4,7-bis{2'-9',9'-bis[(2"-ethylhexyl)-fluorenyl]}-9,9-bis(4'-vinylbenzyl)-fluorene (TFS).

23. A monomer for producing a bulk polymer scintillating material, the monomer comprising: 4-{2'-9',9'-bis[(2"-ethylhexyl)-fluorenyl]}-9,9-bis(4'-vinylbenzyl)-fluorene (DFS).

24. A polymerizable solution for producing a bulk polymer scintillating material, comprising: (i) one or more conjugated monomer molecules having a plurality of polymerizable moieties and conjugated moieties; and (ii) a luminescent additive.

25. The solution as recited in any previous embodiment, wherein the conjugated moiety of the monomer is selected from the group consisting of triphenylamine, triarylamine, triphenyl silane, tetraphenylsilane, diphenyl-1,3,4-oxadiazole, diphenyltrazole, diphenyl benzothiadiazole, fluorenyl benzothiadiazole, fluorenyl thiphene, spirobifluorene and difluorenyl thiophene.

26. The solution as recited in any previous embodiment, wherein the polymerizable moiety of the monomer is selected from the group consisting of acrylate esters, methacrylate esters, acrylic acid, methacrylic acid, acrylamide, methacrylamide, styrene, methyl styrene, oxetanes and epoxides.

27. The solution as recited in any previous embodiment, further comprising at least one sensitizing additive.

28. The solution as recited in any previous embodiment, further comprising: a solvent and an initiator capable of initiating polymerization of the monomers.

29. The solution as recited in any previous embodiment, wherein the sensitizing additive is a high-energy photo sensitizing compound selected from the group consisting of organobismuth compounds, organolead compounds, and barium compounds.

30. The solution as recited in any previous embodiment, wherein the sensitizing additive comprises nanoparticles of compounds containing high atomic number atoms selected from the group consisting of bismuth oxide, bismuth fluoride, bismuth oxyfluoride, gadolinium oxide, gadolinium oxyfluoride, hafnium oxide, and lutetium fluoride.

31. The solution as recited in any previous embodiment solution, wherein the sensitizing additive is a neutron sensitizing additive selected from the group consisting of organolithium compounds, organoboron compounds, organogadolinium compounds, nanoparticles containing lithium, nanoparticles containing boron and nanoparticles containing gadolinium.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 unless the element is expressly recited using the phrase "means for" or "step for".

We claim:

1. A method of producing a bulk polymer scintillating material, comprising:
   (a) providing a solution of [4,7-bis{2'-9',9'-bis[(2"-ethylhexyl)-fluorenyl]}-9,9-bis(4'-vinylbenzyl)-fluorene (TFS)] or [4-{2'-9',9'-bis[(2"-ethylhexyl)-fluorenyl]}-9,9-bis(4'-vinylbenzyl)-fluorene (DFS)] monomers that have at least one polymerizable moiety and at least one conjugated moiety; and
   (b) polymerizing the monomer solution to produce a solid.

2. The method recited in claim 1, wherein said solution of monomers further comprises:
   at least one second monomer selected from the group of monomers consisting of acrylate esters, methacrylate esters, acrylic acid, methacrylic acid, acrylamide, methacrylamide, styrene, methyl styrene, dimethyl styrenes, substituted styrenes, oxetanes and epoxides.

3. The method recited in claim 1, further comprising:
   adding a luminescent additive to the solution of monomers before polymerization.

4. The method recited in claim 3, wherein said luminescent additive is an additive selected from the group consisting of organic dyes, luminescent conjugated molecules, luminescent conjugated polymers, fluorescent organometallic compounds, phosphorescent organometallic compounds, luminescent quantum dots, and mixtures thereof.

5. The method recited in claim 1, further comprising:
adding a sensitizing additive to the solution of monomers before polymerization.

6. The method recited in claim 5, wherein said sensitizing additive is an additive selected from the group consisting of high-energy photo sensitizing compounds, nanoparticles of compounds containing atoms with atomic numbers greater than 52 and neutron sensitizing additives.

7. The method recited in claim 6, wherein said selected high-energy photo sensitizing compound is selected from the group consisting of organobismuth compounds, organolead compounds, and barium compounds.

8. The method recited in claim 5, wherein said sensitizing additive is an additive comprising nanoparticles of compounds containing high atomic numbered atoms selected from the group consisting of bismuth oxide, bismuth fluoride, bismuth oxyfluoride, gadolinium oxide, gadolinium oxyfluoride, hafnium oxide, and lutetium fluoride.

9. The method recited in claim 6, wherein said selected neutron sensitizing additives are selected from the group consisting of organolithium compounds, organoboron compounds, organogadolinium compounds, nanoparticles containing lithium, nanoparticles containing boron and nanoparticles containing gadolinium.

10. The method recited in claim 1, further comprising:
adding an initiator to the solution to initiate polymerization.

11. A method of producing an organic scintillator, comprising:
(a) providing a formulation comprising:
(i) [4,7-bis{2'-9',9'-bis[(2"-ethylhexyl)-fluorenyl]}-9,9-bis(4'-vinylbenzyl)-fluorene (TFS)] or [4-{2'-9',9'-bis[(2"-ethylhexyl)-fluorenyl]}-9,9-bis(4'-vinylbenzyl)-fluorene (DFS)] polymer monomer molecules with a plurality of polymerizable and conjugated moieties; and
(ii) a luminescent additive; and
(iii) a sensitizing additive;
(b) casting the formulation; and
(c) polymerizing said formulation with heat or photoinduced polymerization to form a solid scintillator.

12. The method recited in claim 11, further comprising:
polymerizing the formulation in an inert environment of nitrogen gas or argon gas.

13. The method recited in claim 11, wherein said luminescent additive is an additive selected from the group consisting of organic dyes, luminescent conjugated molecules, luminescent conjugated polymers, fluorescent organometallic compounds, phosphorescent organometallic compounds, luminescent quantum dots, and mixtures thereof.

14. The method recited in claim 11, wherein said sensitizing additive is an additive selected from the group consisting of high-energy photo sensitizing compounds, nanoparticles of compounds containing atoms with atomic numbers greater than 52 and neutron sensitizing additives.

15. The method recited in claim 14, wherein said selected high-energy photo sensitizing compound is selected from the group consisting of organobismuth compounds, organolead compounds, and barium compounds.

16. The method recited in claim 11, wherein said sensitizing additive is an additive comprising nanoparticles of compounds selected from the group consisting of bismuth oxide, bismuth fluoride, bismuth oxyfluoride, gadolinium oxide, gadolinium oxyfluoride, hafnium oxide, and lutetium fluoride.

17. The method recited in claim 14, wherein said selected neutron sensitizing additive of the formulation is selected from the group consisting of organolithium compounds, organoboron compounds, organogadolinium compounds, nanoparticles containing lithium, nanoparticles containing boron and nanoparticles containing gadolinium.

18. The method recited in claim 11, further comprising:
adding an initiator to the formulation to initiate polymerization.

19. The method recited in claim 11, further comprising:
adding at least one second monomer to the formulation selected from the group of monomers consisting of acrylate esters, methacrylate esters, acrylic acid, methacrylic acid, acrylamide, methacrylamide, styrene, methyl styrene, dimethyl styrenes, substituted styrenes, oxetanes and epoxides.

* * * * *